United States Patent [19]
LeBrun et al.

[11] Patent Number: 5,344,132
[45] Date of Patent: Sep. 6, 1994

[54] IMAGE BASED DOCUMENT PROCESSING AND INFORMATION MANAGEMENT SYSTEM AND APPARATUS

[75] Inventors: Thomas Q. LeBrun, Dallas; Kerry Cage; Dennis D. Arnold, both of Carrollton, all of Tex.

[73] Assignee: Digital Image Systems, Dallas, Tex.

[21] Appl. No.: 190,231

[22] Filed: Feb. 1, 1994

Related U.S. Application Data

[60] Continuation of Ser. No. 053,302, Apr. 26, 1993, abandoned, which is a continuation of Ser. No. 865,491, Apr. 9, 1992, abandoned, which is a division of Ser. No. 465,411, Jan. 16, 1990, Pat. No. 5,191,525.

[51] Int. Cl.$^5$ ............................................. B65H 3/04
[52] U.S. Cl. ..................................... 271/35; 271/10; 271/110; 271/111; 271/18; 271/122; 271/256
[58] Field of Search ............... 271/3.1, 18, 35, 110, 271/111, 109, 120, 126, 256, 258, 265, 227, 10, 122

[56] References Cited

U.S. PATENT DOCUMENTS

| | | | |
|---|---|---|---|
| 3,612,511 | 10/1971 | Godlewski | 271/35 |
| 3,903,517 | 9/1975 | Hafner | 340/324 |
| 3,957,366 | 5/1976 | Taylor et al. | 271/110 |
| 4,205,780 | 6/1980 | Burns et al. | 235/454 |
| 4,212,456 | 7/1980 | Ruenzi | 271/110 |
| 4,264,808 | 4/1981 | Owens et al. | 235/379 |
| 4,548,395 | 10/1985 | Snellman et al. | 271/122 |
| 4,553,261 | 11/1985 | Froessl | 382/52 |
| 4,611,800 | 9/1986 | Parsons et al. | 271/3.1 |
| 4,637,598 | 1/1987 | Bouwens et al. | 271/258 |
| 4,918,588 | 4/1990 | Barrett et al. | 364/200 |
| 4,933,979 | 6/1990 | Suzuki et al. | 382/61 |
| 4,934,683 | 6/1990 | Ueda et al. | 271/3.1 |
| 5,035,413 | 7/1991 | Yamada et al. | 271/265 |
| 5,054,096 | 10/1991 | Beizer | 382/41 |

FOREIGN PATENT DOCUMENTS 0115189 8/1984 European Pat. Off. ...... G06K 5/00
1-231188 9/1989 Japan.
WO8911703 11/1989 PCT Int'l Appl. ........... G06K 9/20

OTHER PUBLICATIONS

Tartan XP80 Operator's Manual, Oct. 1988, Recognition Equipment, Inc., Dallas, Tex.
Tartan XP80 Programer's Reference Manual, Oct. 1988, Recognition Equipment, Inc., Dallas, Tex.
Tartan XP80 Product Definition Manual, Apr. 1988, Recognition Equipment, Inc., Dallas, Tex.
S. G. Aden, G. M. Bednar, S. P. Hartman, and R. G. Pierlott III, Document format Selection and Control Process, IBM Techniccal Disclosure Bulletin, vol. 26, No. 9, Feb. 1984.
Tartan XP90 Operator's Manual, Oct. 1987 Recognition Equipment, Inc., Dallas, Tex.

Primary Examiner—H. Grant Skaggs
Attorney, Agent, or Firm—Johnson & Wortley

[57] ABSTRACT

The present invention comprises an image based document processing and information management system and apparatus. It provides a more efficient method and apparatus for handling large volumes of form based business transactions using a digital image-based system for the capture, identification and processing of images, statistics and business data. The system converts documents, such as forms and supporting pages, into digital data which can be used to update computer records and to manage and support the adjudicative processing of business transactions by human operators at computer terminals.

29 Claims, 10 Drawing Sheets

IMAGE MANAGEMENT AND GENERALIZED ENTRY SYSTEM

File    Browse    Edit Object    Writers    Directors

Actors    Improvisors    Chorus    Scenarios    Stagehands

Your first name and initial        Last name

*J J*        *Mosely*

Home address (number and street). (If you have a P.O.

*1010 Fort naught St*

City, town, or post office, state and ZIP code.

*Austin, Tex 74010*

Name and Address reset    IQC    help    ABORT    OK

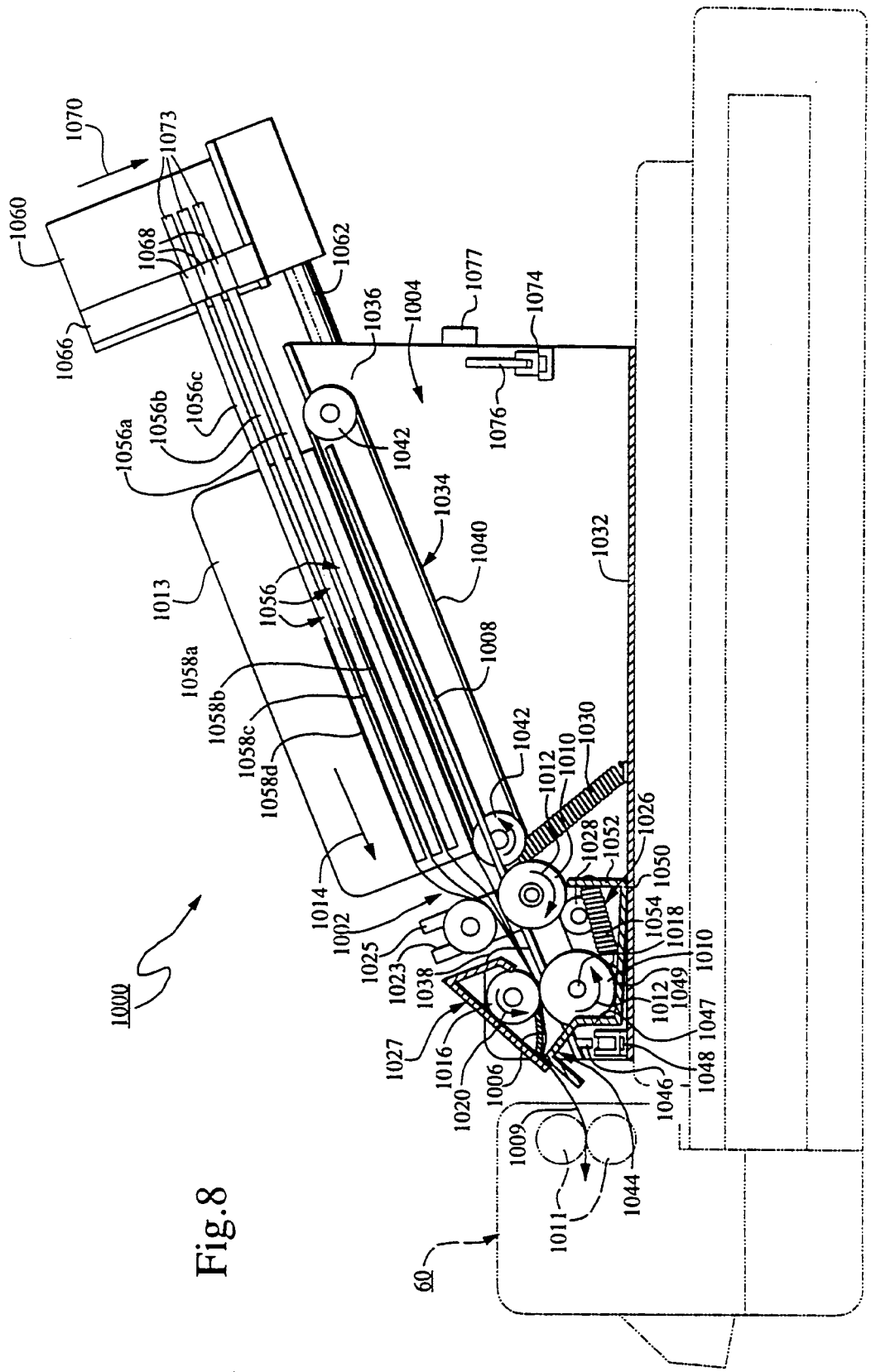

IMAGE BASED DOCUMENT PROCESSING AND INFORMATION MANAGEMENT SYSTEM AND APPARATUS

This is a continuation of application Ser. No. 08/053,302, filed Apr. 26, 1993, now abandoned, which is a continuation of application Ser. No. 07/865,491 filed Apr. 9, 1992 now abandoned which in turn is a division of application Ser. No. 07/465,441, filed Jan. 16, 1990, now U.S. Pat. No. 5,191,525.

BACKGROUND OF THE INVENTION

This invention relates to an image based document processing system and apparatus for converting paper documents into electronic data and electronic images and managing the transactions initiated by those documents using both the images and data extracted from the images. The system manages document entry and flow within a business or other organization by allowing user interaction with the electronically captured document.

In the processing of transaction documents by a large business or governmental agency, there is generally a need to accomplish at least three basic objectives. The first objective relates to the capture of data so that it can be electronically stored, for example, by transmittal to a host computer system. This data may be pertinent to accounts payable, insurance policyholder records, mail order records, taxpayer records or other business information. Secondly, there is a need to index and record the images of the documents from which the stored data was extracted for future retrieval and usage. Third, there is a need to manage the transactions requiring human judgement initiated by the documents and supply the captured data and image for use in the processing of a transaction, such as adjudicating an insurance claim or underwriting a loan application in the usual course of business. Until the present invention, there has not been a satisfactory method or apparatus for automatically capturing, identifying, indexing, and recording data and images from an incoming stream of documents of intermixed sizes and formats for future interactive use.

Many companies employ manual sorting of documents, generally beginning with the receipt of the documents in a mailroom. The disadvantages inherent in such systems of document sorting are numerous. For example, sorting documents in the mailroom is labor intensive and costly. Manual sorting results in far greater error and document misidentification than electronic classification accomplished pursuant to the present invention.

Manual sorting of the contents of an envelope is presently accomplished in several ways. Documents may be sorted by size, so that all documents with the same physical dimensions and format, such as 1040 Tax Forms, are manually segregated and grouped. This grouping is necessary because prior automatic document processing devices cannot accommodate documents of varying format. This pre-selection is necessary, using prior systems, to enable the software system to identify the data fields as they are geographically located on the document page. Pre-selection is also generally required in prior systems to accommodate paper feeding devices which will not tolerate varying sizes and weights of input documents.

With the introduction of optical readers, some flexibility was introduced into the system by first labeling each document with a unique identification which identifies the format of the document and allows the system to accommodate different forms without being separated into individual pre-sized groups. However, this system requires that the document format be pre-serialized, and many forms and documents exist without a serialized identification. Thus, many documents are not readable by this pre-serialized type of system. Accordingly, the capability of processing many of the different sized and format documents did not exist before the present invention.

Thus, even with pre-serialized systems, there has been a need in the industry for a document processing system which accomplishes electronic identification, delivery, storage, and retrieval of documents of various sizes and types, without the need for a special ID code or other serially printed mark to ascertain the identity of the document under observation. Also needed is a system which may be adapted for existing tax forms and other documents without the necessity of changing these standardized tax forms or other documents to include pre-printed marks or numbers.

U.S. Pat. No. 4,205,780 (the "'780 patent") relates to a document processing system with a video camera and television monitor. The typical document transport as described in the '780 patent has the capability of reading magnetic ink character recognition (MICR) data or OCR data encoded on the documents being processed, recording the data, and sorting the documents in a predetermined manner, but requires that the documents be sorted by bank employees before they are loaded into the document scanner and that all the document formats conform. "Header" and "trailer" cards function to separate each batch of documents. Header cards contain MICR data that identify the account being processed.

The present invention differs from the '780 patent disclosure. For instance, the '780 patent describes the use of MICR and OCR machine readable characters in processing check transactions. Stylized characters and special fonts are used, pursuant to the '780 patent, to allow machine recognition of forms and remittance documents which are pre-printed and manufactured, thus avoiding the automatic identification of other forms which are not specially pre-printed. However, the present invention uses the ability to automatically identify documents that are not pre-printed to keep envelope contents separate, processing the contents of the envelopes as a transaction.

The '780 patent requires that human operators routinely enter data by hand keying the data on a keyboard. The present invention, however, allows for data capture without operator keying in many applications. This results because the present system will locate and extract data from existing forms after identifying the forms. In cases where data is machine readable, no operator keying is necessary for most data with the present invention.

SUMMARY OF THE INVENTION

In contrast to the prior data capture systems described, the document imaging system of the present invention can capture an optical image of numerous intermixed documents of different sizes and formats, taken directly from opened mail, serially number them before or after image capture, automatically separate the checks, identify the form or document under observation, and manipulate the image data in an advantageous and required manner. After identification of the document, the present system can electronically carve and read specific data fields automatically. Human operators key correct the data for automatic auditing in a manner that is much more efficient than previous data entry systems. The invention permits less skilled operators to specialize, thereby requiring less training of these relatively unskilled operators.

One advantage of the present system over previously known data capture systems is that known systems generally require that documents received in a mailroom or other data collection center be sorted into homogenous groups. For example, a clerk in a company mailroom using previously existing systems is required to sort, batch, and count various business forms and paper materials prior to sending these materials to an optical scanning device or data entry department.

Accordingly, the present invention provides a novel method and apparatus that overcomes the limitations and disadvantages of the prior art. The present invention also speeds up the process of document processing so that a higher volume of transactions can be processed by allowing multiple transports and terminals to operate in parallel on the same communications network. Further, the present invention reduces the number of errors which were heretofore considered to be inherent in a document processing operation.

A significant advantage of the present system for document retrieval and storage is that the data keying operator or adjudicator need not be directly involved with aspects such as the time of receipt or the location of a particular document or data field. In the preferred embodiment, incoming mail is extracted from envelopes in a mailroom and the pieces of mail are immediately scanned on an optical scanner serially, with no particular vertical orientation, i.e., with their wording right side up or upside down. The documents are sequentially numbered with a numbering device as they pass through the optical scanner, and are separated on a stacker separator to separate selected pages or checks from document forms and other pages. The same sequence number is electronically assigned to the captured image of the document, and to the data extracted from the document. This allows for subsequent hard copy retrieval for rescanning in cases in which an image is illegible, or for other evidentiary reasons. In these cases it is possible for an operator to retrieve the original hard copy based upon the partial image and the item sequence number. Thus, the adjudicator may return to the original hard copy if necessary.

As a document page proceeds through the scanner, a digital picture of the page is taken. This image is captured at a resolution ranging from 150 to 400 pels.

The next step relates to the identification of the document which now resides in the system as a unique captured electronic image or graphics screen. The software in the present system carves a previously ascertained identification area from the document. In order that this may be accomplished, a number of identification areas are chosen in advance by a designer from the existing printed forms using an interactive computer display. The co-ordinates of identification areas are stored in the computer and accessed for carving the identification area from the documents, thus identifying the document. Forms need not be redesigned to enable automatic identification.

After document identification is complete, graphical data areas are carved for recognition and correction if necessary. The electronic image of the document, compressed if desired, is sent over a local area network and stored on magnetic disk for ready access to other portions of the system. The extracted and audited data is sent to a host computer for processing.

The present invention may be advantageously adapted to existing tax forms and other documents because a designer may choose an existing identification area or word for identifying the document. This advantage is not available with previously known systems.

The chosen identification area presently existing on the document is used as a geographical reference point for the entire spatial image of the document. All other graphical data areas on the document are carved in reference to the identification area located by the processing system.

In choosing the identification area, the designer preselects a word or an area already existing on the form. The geographic location of the area and the spelling of a word, or the electronic signature of the pel pattern of the area are used as identifying criteria when appropriate. The intelligent character reader (ICR) in the system may examine the pre-chosen identification areas to interpret a word on the document, and identify the document. For instance, on a 1040 tax form, the word identifier might be the word "exemptions" as in FIG. 6.

An additional advantage of the present optical scanning system invention is that a document may be inserted into the scanner either inverted or properly justified. The software accommodates and automatically inverts upside down identification fields and their related document images to properly read data in either position. When a dual sided scanner is used, documents may be inserted either face up or face down.

The identified carved portion of the graphics screen image of the document is used to spatially reference graphical data areas of the graphics screen for conversion to usable character data. The first graphical data area carved from the image is known as the "predictor field." The predictor field has special significance. The predictor field is used to determine whether the image residing within a graphical data area was originally printed manually or by a machine. Because recognition techniques differ for these two different types of images, the initial determination of whether original data appearing as an image in the graphical data area was machine printed or manually written is used throughout to determine which type of processing each graphical data area will receive. If the desired data to be captured from the document is machine printed, the system will determine the pitch of the letters. This information is used in all subsequent carving and interpretation of the remaining graphical data areas on the document.

An additional advantage of the image processing subsystem of the present system is that it can logically deduce the amount of skew in the document image. Perfect alignment is seldom possible, therefore, document skew is normally present in the data fields due to variations in the exact spatial coordinates of documents which are mechanically inserted and fed into the optical scanning device. Once the amount of skew is determined, the program can deduce the proper adjustment for carving and extracting data from the data fields.

A further significant advantage of the present invention is its adjudicative ability. The efficiency of data correction/entry clerks is greatly increased by the present system. The present system reduces the adjudicative or decision making functions required of data entry personnel because they key only what they see and then only from a discriminate graphical data area.

High productivity rates are thus possible with the present system. For instance, data corrector/entry operators may increase their keystroke rate productivity to levels as high as 20,000 keystrokes per hour. Unlike previously known systems, it is not necessary that personnel be aware of the type of document under observation or the relationship among specific fields from which data is extracted. It is only necessary that data corrector/entry personnel key information as it is rapidly and continuously placed in front of them. These operators may specialize in certain fields such as, for instance, only numerical fields, such as social security number fields, or only alphanumeric fields such as name and address fields. This specialization advantageously reduces error and costs associated with operator training. This allows, for example, an operator with only a numerical key pad to process only numerical fields, allowing for high input rate and decreased cost.

The present invention obviates the need to manually deliver documents to various departments or groups within an organization. This results because the documents are converted to electronic data and images, and are automatically available to host computers and to data/document manipulation personnel through interface work stations.

The present invention, in its preferred embodiment, uses a wand mechanism to separate different transactions. The contents of each envelope is termed a "transaction". Separator cards are not required with the present invention to separate each transaction. This is a significant advantage because separator cards waste valuable computer memory and time that might otherwise be available for data manipulation or storage. More significantly, the use of a wand allows for the contents of an envelope to be processed sequentially together, thus allowing for transaction integrity. Wands may also be used to separate batches of transactions.

The present invention allows for automatic character recognition of machine printed characters, such as typewritten, upon existing forms, such as 1040 tax forms. These forms are "read" for a determination of the data residing thereon without changing the forms to accommodate the system. Special stylized characters and special pre-printed fonts are advantageously not required with the present invention.

Another significant advantage of the present invention is that data keying errors may be reduced by rerouting or circulating the data in a logical error reduction sequence. For example, an audit in the system tests data for accuracy once it has been read and keyed by an operator. The auditing system uses a second operator who keys the same data keyed by a first operator. The system then compares the two data fields to determine whether or not they are identical. When the data fields are not identical and the keyed data has failed the audit, the system uses a third operator. In that case, one of the data fields previously keyed will be routed to the third adjudicative operator for keying. This third data field, when matched with one of the first two data fields, proves, with almost complete accuracy, which of the original two data fields was keyed incorrectly. The adjudicative subroutine then chooses the "matched" data in preference to the incorrect data. Operators are usually unaware whether they are keying the first, second or third iteration. Thus, keystroke errors may be essentially eliminated with the present invention.

The present invention also provides a method of evaluating the accuracy of data key operators. A statistical summary of operator errors and operator performance may be retained in memory for future use in evaluating data operators.

One step in the process of the present system is the recording of the image of each document in a digital medium as a graphics image. This recording of the image may be on magnetic or optical disks, microfilm, 8 millimeter magnetic or optical tape, or some other suitable digital data recordation and storage means. In many applications, such as the insurance industry, data must be stored, and yet available, for extended periods of time. An ongoing file may require that the data be retrieved and operated on many times before a file is closed.

Once data is recorded and properly indexed by keys and addresses, for example within the data base, the system or an optional host computer manages work flow and directs the routing of transactions and associated document images to specific operators. In this manner, an unlimited number of adjudicators and employees may access, correct, or view the data simultaneously in an interactive mode. This system of document availability to a number of operators greatly increases the efficiency of a business organization.

BRIEF DESCRIPTION OF THE DRAWINGS

The advantages and technical advances of the preferred embodiment of the present invention can be discerned by reference to the following drawings and schematic diagrams:

FIG. 4 represents, as an illustration, the application of this invention to a typical hand written social security number field which has been electronically carved from a document as it appears on a terminal, displayed as a graphical data area;

FIG. 5 depicts a hand written alpha-numeric field in the form of a name and address field as it appears, displayed on a terminal screen as a graphical data area;

FIG. 6 shows an operator selecting the word identifier "exemption" on a typical federal tax form in another application of the preferred embodiment of this invention;

FIG. 8 is a side view of the preferred automatic feeder apparatus of the document capture system according to the present invention.

DESCRIPTION OF THE PREFERRED EMBODIMENT

Figure 1:
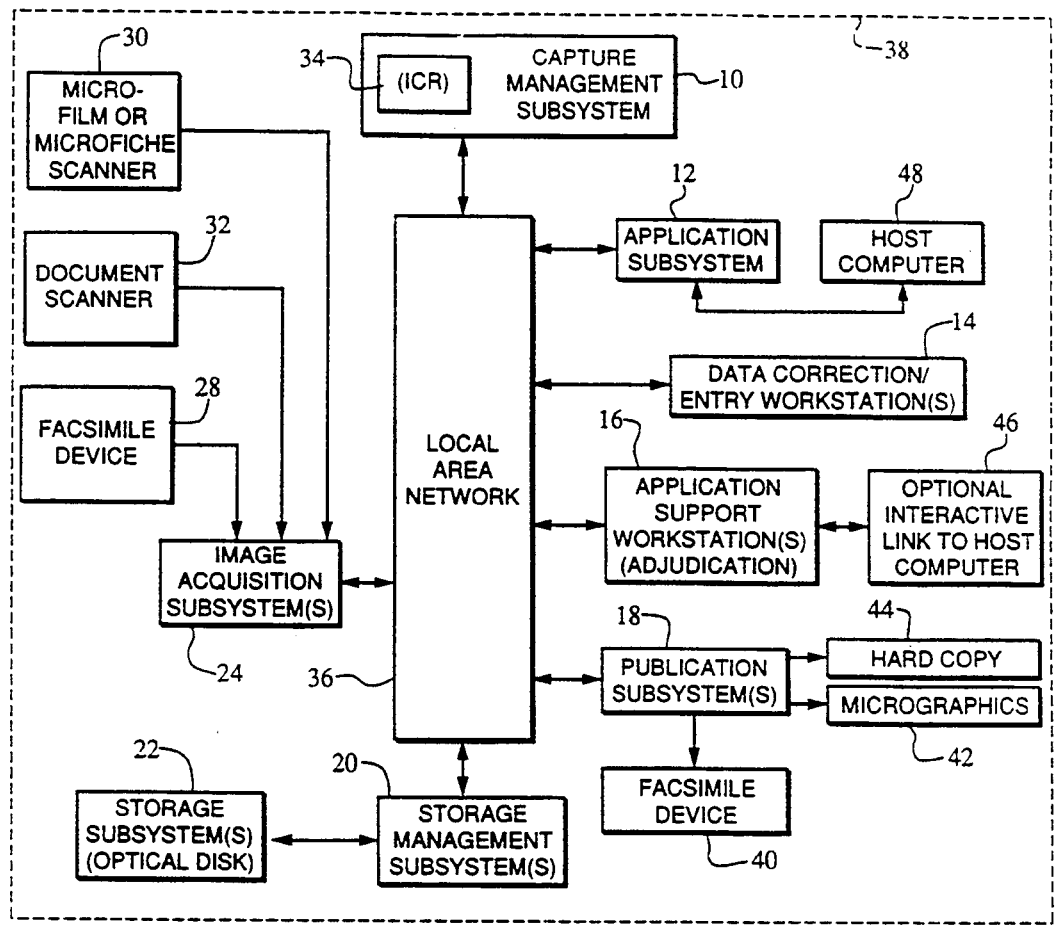
FIG. 1 depicts a typical block diagram of the configuration of the preferred embodiment of the document capture, processing, storage, and retrieval system of the present invention.

One embodiment of the present invention is illustrated as a block diagram in FIG. 1 as incorporated into a document processing system organized around a local area network (LAN) which may be Novell. The local area network, indicated as block 36, forms the central component of the document processing and information management system 38. All subsystems including the image acquisition subsystem, indicated as block 24, communicate with the local area network 36. The image acquisition subsystem 24 conveys the captured image from an input device to the local area network 36. The input of documents may occur through a microfilm or microfiche scanner 30, paper scanner 32, or facsimile device 28.

Each subsystem contains modules of software which can function in a single dedicated computer, or which can be shared with other computer subsystems. The image acquisition subsystem 24, the capture management subsystem indicated as block 10, the application subsystem indicated as block 12, the data correction/entry workstation 14, the application support workstation 16, the storage management subsystem indicated as block 20 and the intelligent character reader (ICR) indicated by block 34 can all share a single computer environment in a very low volume use of the invention.

Figure 1A:
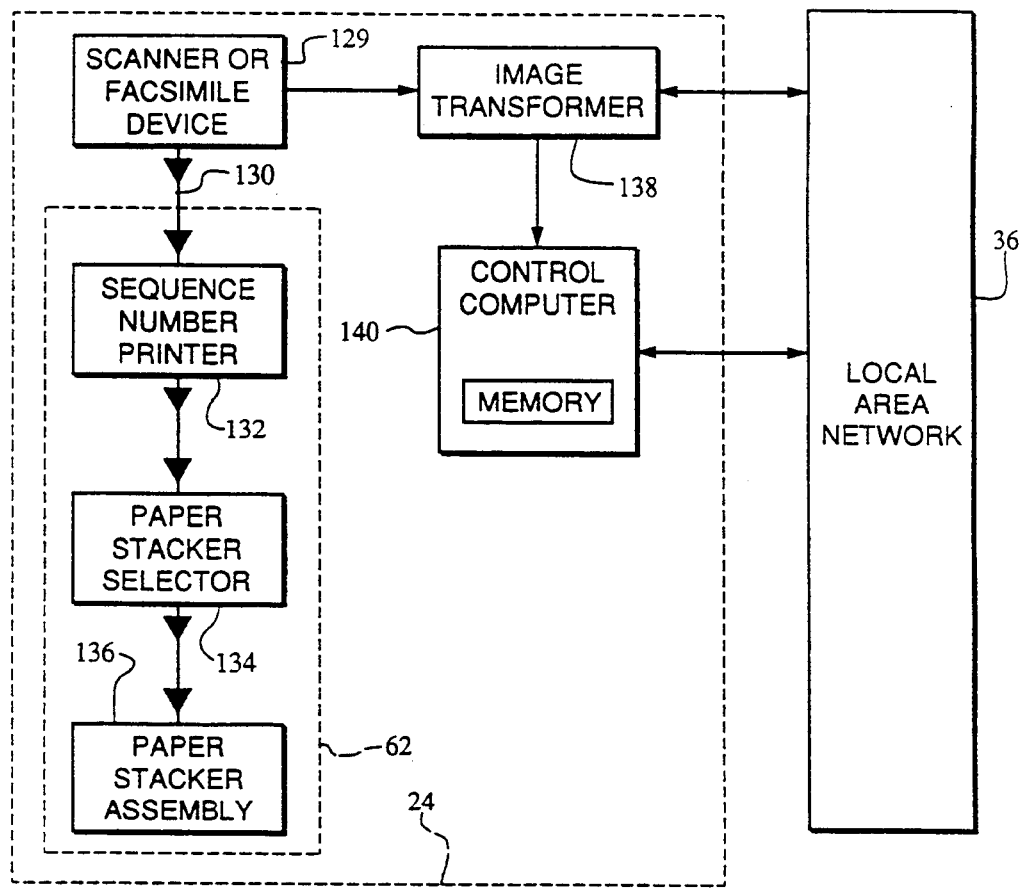
FIG. 1(a) represents a more detailed block diagram of the image acquisition subsystem shown in FIG. 1 which shows the paper path and digital image production.
Figure 1C:
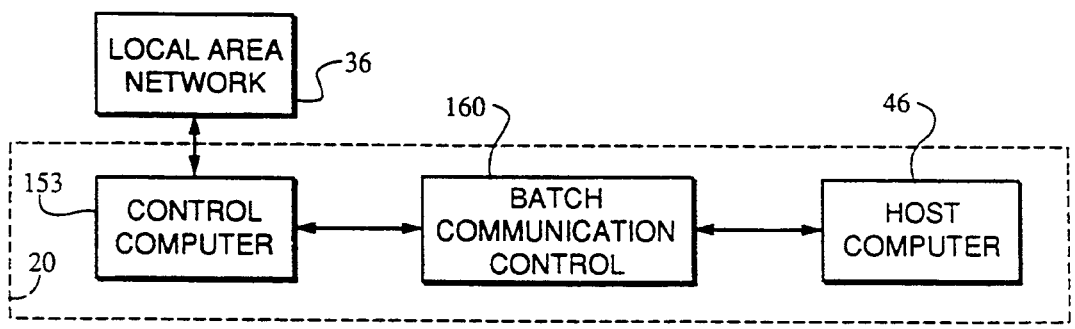
FIG. 1(c) depicts the block diagram of the application subsystem responsible for managing data and image flow as individual graphics into and out of storage.
Figure 1B:
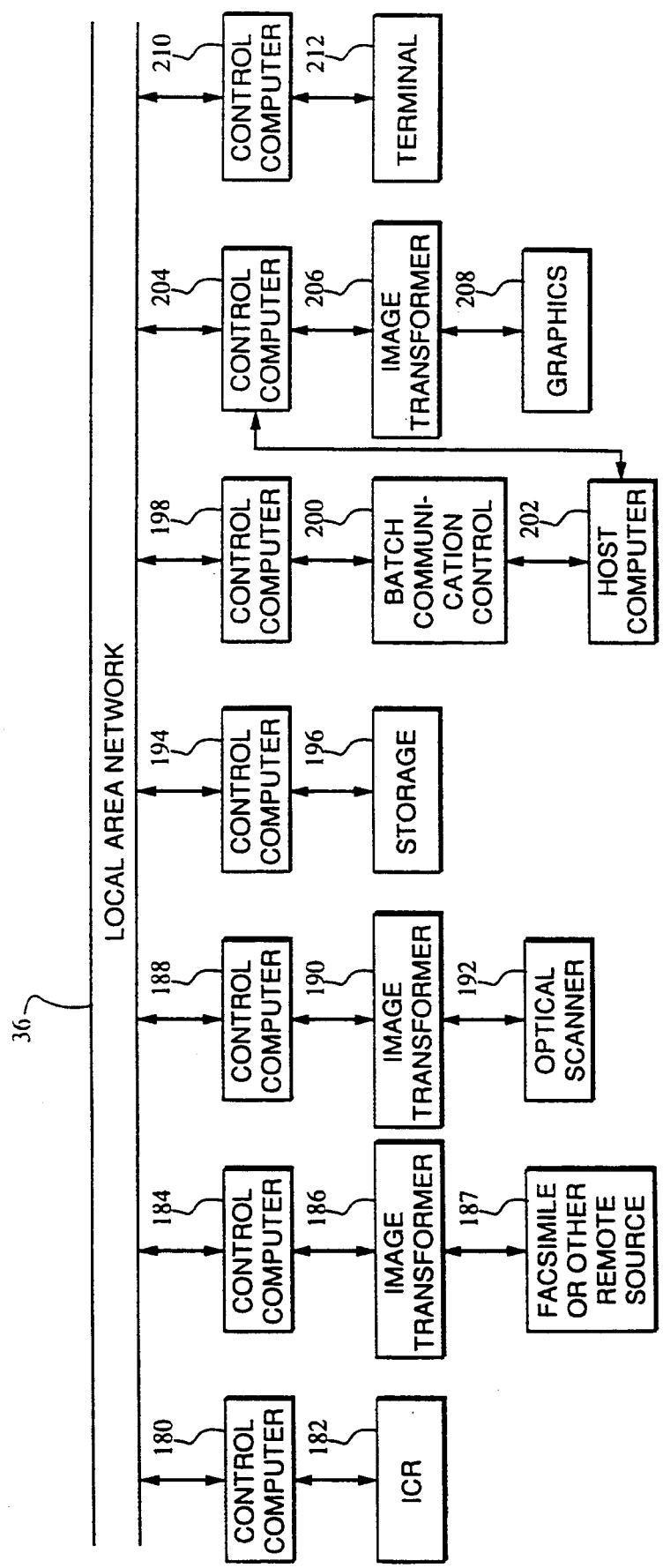
FIG. 1(b) is an alternative block diagram of the preferred embodiment whereby separate "nodes" cooperate within the local area network.

FIG. 1(b) shows an alternate arrangement for the document processing system for high volume applications of the present invention. A control computer 180, 184, 188, 194, 198, 204, 210 is provided to each subsystem for data processing. Image transformer 186 receives digital data via telecommunications from a facsimile or other remote source, indicated as block 187 by suitable means such as a serial port. Image transformer 186 converts the digital data to provide a graphics image of each document received from the remote location to the LAN network via control computer 184. A second image transformer 190 receives digital data by suitable means such as a serial port from an optical scanner 192, and provides a graphics image of each document that is compressed or uncompressed to the local area network via control computer 188. An image character reader 182 provides ASCII data to the local area network 36. Storage 196 in the form of hard or optical discs receives and stores graphics images and character data from the LAN 36. An optional host computer 202, which may be an IBM, manages batches of transactions in conjunction with batch communication control 200. Interactive communication, e.g. IBM 3278, between control computer 204 and host computer 202 provides graphics output from a third image transformer 206 directly to host computer 202. Terminal 212 receives a graphics screen image and, when necessary for correction purposes, character string data. Terminal 212 provides operator input to LAN 36 through control computer 210.

The Image Acquisition Subsystem

The image acquisition subsystem 24 is responsible for the transfer of an image compressed or uncompressed, in the form of a raster graphics image of each document, suitable for entry onto the local area network 36. In order that the graphics image may be produced, a signal is first received from a scanner or a facsimile device as illustrated by block 129 in FIG. 1(a).

Referring to FIG. 1, scanner 129 may be a microfilm or microfiche scanner as indicated by block 30, a document scanner as indicated by block 32, and a facsimile device as indicated by block 28. The facsimile device 28 may be a Gamafax ® facsimile emulation device for use with an IBM PC AT compatible, with a modem, functioning at 9600 band rate. The microfilm or microfiche scanner 30 may be a Mekel ® M400 available from Mekel Engineering in Walnut, Calif. The scanner 129, however, may not constitute all of these devices, or may constitute other suitable input devices.

Figure 2:
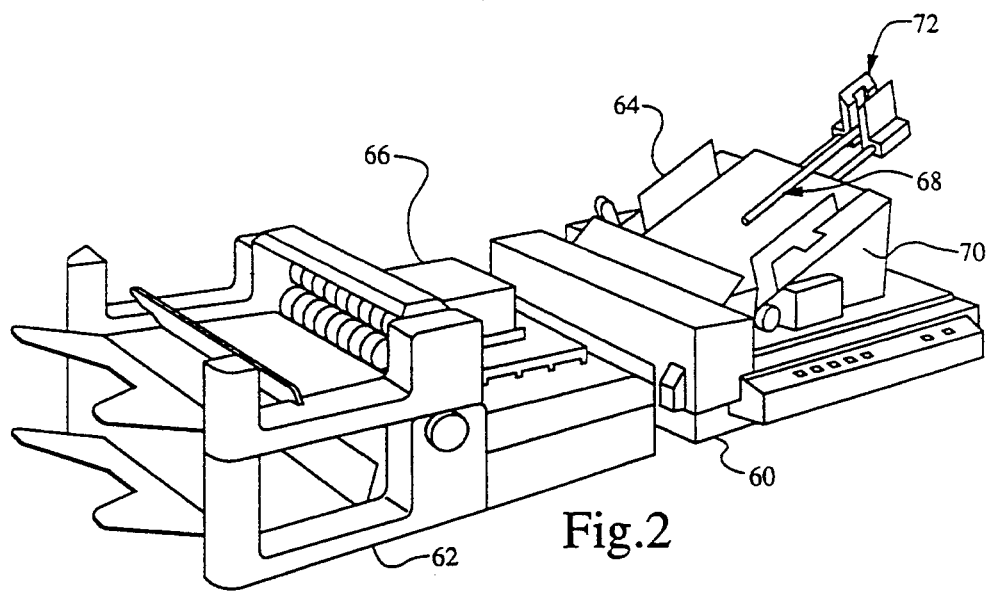
FIG. 2 is a perspective view of the hardware configuration for the typical image acquisition subsystem shown in block diagram in FIG. 1(a) constituting document feeding, printing, scanning, separating, and stacking devices.

The scanner 129 is connected via suitable means such as a serial port to an image transfer system 138 in the form of a Kofax Image Products Series 8200 board, preferably an 8204, located in an expansion slot of a control computer 140 that processes the signal from the scanner 28, 30, 32. Preferably, the control computer 140 is an IBM AT compatible computer with an 80386 mother board, a hard disk drive, two megabytes of expanded memory, a floppy disk and a Proteon LAN interface card mounted in one of its other slots. Additionally, an optional keyboard and display, with associated graphic support, may be connected to control computer 140 for user interaction with a captured image.

Where a document scanning device, as indicated by block 32, is used, the preferred device is a Fujitsu America scanner model 3096E(a) optical scanner for one-sided forms. A TDC scanner may be used for two-sided forms, although other suitable devices can also be substituted. An optical scanner 60 is shown in FIG. 2. A Digital Image Systems Company (or "DI") model 401 document separator 62 (see FIG. 2) receives documents from the document scanner 60.

Regardless of what type of scanner 129 is used, which may even constitute a signal from a conventional group 3 or group 4 facsimile device over local or remote telephone lines, the signal is in the form of a serial digital bit stream. In applications requiring more voluminous documents processing, a separate control computer may be provided for each subsystem as seen in FIG. 1(b), each computer communicating with local area network 36.

The image transformer 138, FIG. 1a, receives the signal, processes the signal into usable data and compresses the data into a first output image in the form of a unique graphics image of each of the documents processed by the scanner 129. The output from the image transformer 138 is passed to the local area network 36. Alternatively, an optional magnetic disk storage or other type of mass storage medium may receive graphics screen image data from control computer 140.

Figure 9:
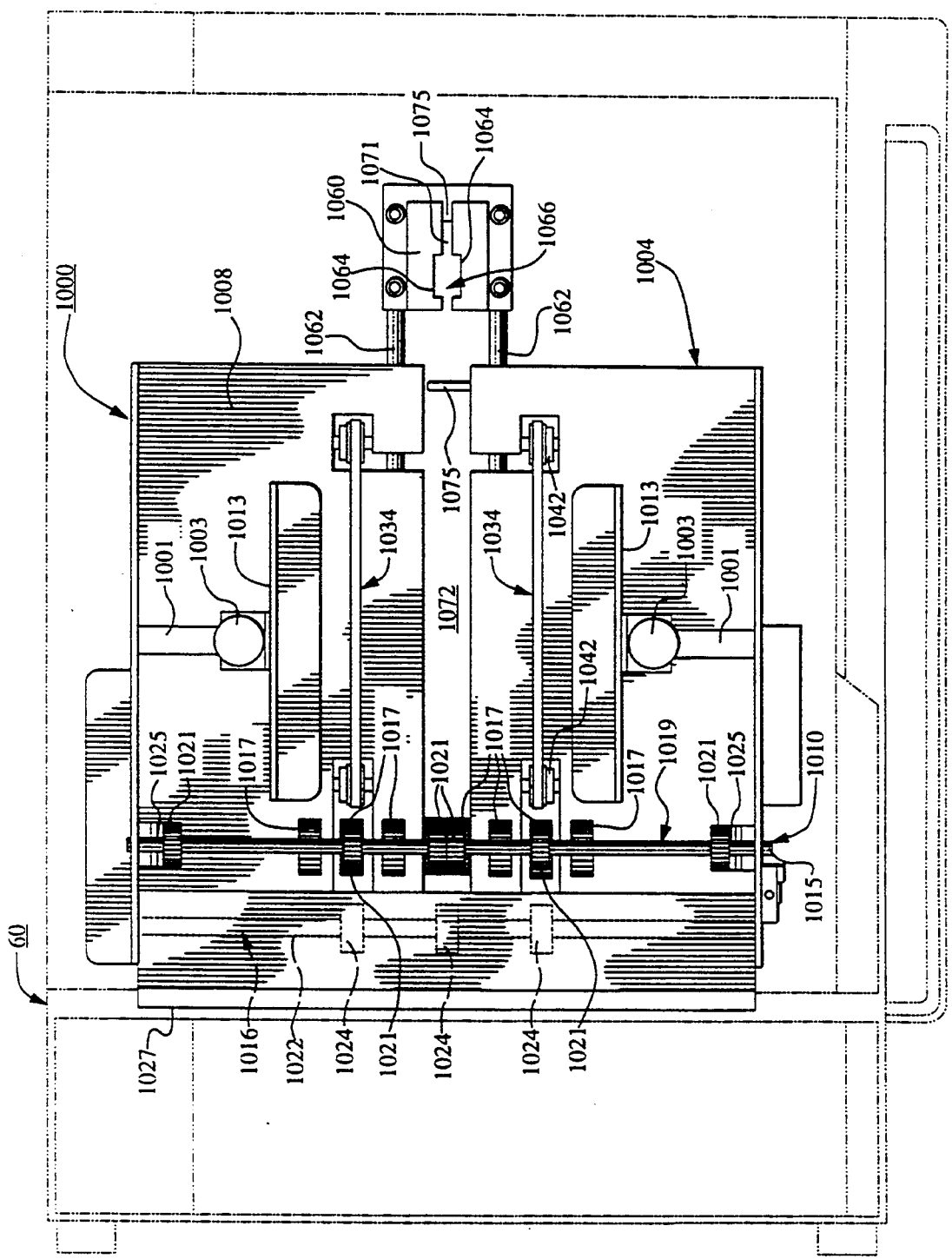
FIG. 9 is a top view of the preferred feeder shown in FIG. 8.

The left half of FIG. 1(a) depicts the paper path 130 in those cases in which the document received is paper. In order for each document to be converted into a usable signal that is receivable by the image transformer 138, each document must be fed one at a time to the document scanner, illustrated in FIG. 1 as block 32 and shown in FIG. 2 at 60. In order that this may be best accomplished, the present invention provides an auto feeder 1000, as shown in FIGS. 8 and 9, and described in detail below.

Generally, envelopes received in the mailroom contain multiple sheets of paper and sometimes a check. In the past, the contents of the envelopes were sorted by size by a clerk so all documents of the same size were manually counted, segregated and grouped. The contents of the envelopes could even be sorted into stacks in which each stack contains documents of the same format, such as 1040 tax forms. In addition, each document in a stack was required to be oriented in the same direction. But, such sorting is extremely time-consuming and costly.

However, the present invention is able to process documents of intermixed sizes and format without the necessity of each document format being identified by a unique identification stamped on each document. In order to process documents of intermixed sizes and format, the present invention provides an automatic feeder 1000 usable with different sized sheets of paper and checks, commonly termed documents hereafter, which are stacked together. The contents of each envelope are now kept together as a transaction and fed consecutively through the system first, for scanning, and afterwards, for archival serialization without being separated.

In the past, documents of the same format had to be processed together, thus forming a type of batch, identified by the common format of each document. Each batch was separated by "header" and "trailer" cards. Commonly, these cards contained magnetic ink character recognition data (MICR) that identified the common format of the documents of each batch. These cards flowed along through the system with the documents, taking up processing time and were scanned, serialized, and stored along with the images of the documents by the system, wasting valuable computer time and memory. More importantly, transaction integrity was broken because different document types from the same transaction were placed in different batches. Accordingly, expensive error prone procedures were required to maintain the relationship of the separated documents during processing and subsequent retrieval.

However, because the present invention processes documents which are of a different size and format, a transaction may constitute the contents of each unique envelope. This ability to handle documents of intermixed sizes is the strength of the system. Thus, not only may those documents which have a common format be processed together as a transaction, the present invention allows the contents of an envelope, which may constitute different size and format sheets of paper and a check, to be processed together. Even "white mail" which may contain address changes, complaints, instructions, etc., may now be processed in the same transaction and associated with an individual or account by virtue of being included in the same transaction. Because this new capability exists, transaction integrity can be maintained. The individual documents associated with each transaction can be kept associated, without allowing the images and data from one individual or account to be mixed with that of another.

In order to maintain this integrity, these transactions also require separation, but "header" and "trailer" cards are not required with the present invention. Instead, the present invention implements two different means of virtual separation, as described hereafter, which do not physically accompany the documents being processed by the system, but which determines the end of each transaction, allowing the present invention to electronically maintain the integrity of each transaction. This is a significant advantage because clerical labor and errors are avoided, and valuable computer time and memory are now freed, allowing the computer to process more transactions during a comparable time frame.

One preferred way to accomplish virtual separation is by a wand mechanism as described hereafter. Another preferred way to accomplish virtual separation is by placing a unique document, recognizable by the system, first in each transaction. With the second preferred way of accomplishing virtual separation, the operator places the unique document, i.e. a 1040 form of a tax return, first on the feeder. When the system encounters a second unique document, the beginning of another transaction is signaled, and the documents between the previous unique document and the second unique document, including the previous unique documents but not including the second unique document, are identified as belonging to the first transaction. When the control computer 140 receives the signal, logical separation is established by suitable methods such as a unique data key to locate the database addresses of the graphics images of each of the documents, and subsequent character data interpreted from graphical data areas of each graphics image. When a unique document is not present, the operator uses the wand mechanism as described hereafter to establish virtual separation.

FIG. 8 represents an expanded detailed view of the feeder mechanism of the present invention encompassing the wand mechanism, as shown generally in the upper right portion of FIG. 2 (See document feeder 64 in FIG. 2). Referring to FIG. 8, the preferred feeder 1000 usable for feeding a stack of documents 1002 of intermixed size and format, and usable for detecting the boundary of each transaction included in the stack of documents 1002 is shown. The feeder 1000 includes a base 1004 on which the stack 1002 is located, and means associated with base 1004 for feeding a single document 1006 from the stack of documents 1002 while leaving the remaining documents stacked on base 1004. The base 1004 has an elongated, wedge shape, and includes a planar face 1008 over which the stack of documents 1002 is located that is oriented at an angle to the horizontal with its front end positioned at its nadir or lowermost point. Each document is fed forward, but downwardly across planar face 1008 of base 1004 to an optical scanning device 60 shown in phantom and also shown in the document feeder 64 in FIG. 2, as indicated by arrow 1009 that receives the document passing each document between roller 1011.

A pair of vertically extending retainers 1013 may be provided to keep the documents in the processing path, thus preventing the documents from moving sideways and off the feeder 1000. Accordingly, planar face 1008 is provided with slots 1001 in which the retainers 1013 are located. The retainers 1013 can be adjusted apart as necessary via slots 1001 and tightened into position by thumbscrews 1003.

The means for feeding a single document includes a pick drive means in the form of a pair of spaced, longitudinal pick rollers 1010 located in front of the base 1004 that drive the lowermost document of the stack 1002 forward from the stack 1002 and feed the document while aligning the next document of the stack 1002 to be fed. The pick rollers 1010 are positioned laterally across the front end of planar face 1008, which is located at the front end of base 1004, with their axes lying along a plane parallel to the planar face 1008 of base 1004. The pick rollers 1010 lie laterally across the forward path of the documents, and turn counterclockwise as indicated in the figure at 1012 in a direction suitable for driving the lowermost document of the stack forward, as indicated by arrow 1014. Preferably, but not shown in the figures, each pick roller 1010 includes an elongated rod 1015, shown partially in FIG. 9, and a number of narrow roller members spaced along the length of the rod that are attached thereto for rotation therewith. In order to rotate each pick roller 1010 and its roller members, each rod includes means such as sprockets or drive belts attached thereto for rotation thereof such that both pick rollers 1010 rotate counterclockwise at the same time.

Located above pick rollers 1010 is a weighted bar 1019. Weighted bar 1019 includes a series of narrow rollers 1021 positioned above rollers 1017. Weighted bar 1019 is slidably located in a slot 1023 in rachet 1025 to move freely in a vertical direction and, when present, aids in the initial flattening of documents prior to being fed and processed.

The means for feeding a single document also includes a means in the form of a longitudinal-back scrubber roller 1016 adjacent the pick rollers 1010 for allowing only one document to leave the stack 1002 at a time. Back scrubber roller 1016 lies positioned parallel and above the forwardmost pick roller 1018 distal the front end of base 1004. Back scrubber roller 1016 lies longitudinally along the backside of pick roller 1018, biased against its backside. Back scrubber roller 1016 has a diameter less than the diameter of pick rollers 1010, and rotates counterclockwise as indicated at 1020. Referring to FIG. 9, back scrubber roller 1016 includes an elongated rod 1022, shown in phantom, and a number of narrow roller members 1024, shown in phantom, spaced along the length of rod 1022 that are attached thereto for rotation therewith. In order to rotate back scrubber roller 1016, the rod 1022 includes means such as sprockets or drive belts attached thereto for rotation thereof. Located above back scrubber roller 1016 is a cover 1027, pivotally attached to base 1004 for access to roller 1016.

Referring to FIG. 8, both pick rollers 1010 are rotatively mounted on a connecting web 1026 that is mounted to pivot about an eccentric roller 1028, mounted adjacent to the bottom of base 1004. Eccentric roller 1028 provides a biasing means for urging pick roller 1018 against back scrubber roller 1016 that is adjustable by rotating eccentric roller 1028. A tension spring 1030 attached to the rear portion of web 1026 extends downwardly to attach to the bottom 1032 of base 1004. Tension spring 1030 provides a second biasing means for biasing pick roller 1018 against back scrubber roller 1016, as more pressure is needed for thicker paper. The diameter of back scrubber roller 1016, the rate at which roller 1016 counter-rotates relative to roller 1018 while pivoting about eccentric roller 1016 and the tensile force of spring 1030 are such that pick roller 1018 is urged against back scrubber roller 1016 with a suitable force so that only one document at a time may leave the stack 1002 and pass between rollers 1016 and 1018.

The means for feeding a single document also includes a continuous drive means in the form of a pair of elongated belt drives 1034 located along base 1004 for urging the stack 1002 adjacent the pick rollers 1010. The belt drives 1034 are positioned parallel, but spaced along the base 1004 below the stack of documents 1002 with their longitudinal portions parallel to planar face 1008 of base 1004. The upper longitudinal portion of the belt drives 1034 engage the bottom of the stack of documents 1002, and the belt drives 1034 turn in a counterclockwise direction as indicated by arrow 1036, suitable for urging the stack 1002 forward over the pick rollers 1010 to a position in which all, or the lower portion of the stack 1002 contacts along the backside 1038 of the back scrubber roller 1016.

Each belt drive 1034 includes a continuous belt 1040 which is located around a pair of drive wheels 1042 and rotates therewith. Each pair of drive wheels 1042 is connected to a suitable drive means so that all drive wheels 1042 rotate simultaneously.

The means for feeding a single document includes a detection means adjacent the pick rollers 1010 that is engaged by the movement of the lower portion of the stack 1002 adjacent the pick rollers 1010 for activating the pick rollers 1010. Referring to FIG. 8, the detection means is in the form of a longitudinal detector web 1044 that is biased against the front side of the forwardmost pick roller 1018, and extends outwardly and forwardly from the front side of the forwardmost pick roller 1018 below its apex. Detector web 1044 includes laterally intersecting elongated portions. Extending downwardly from web 1044 is a switch portion 1046 engageable with a complementary switch portion 1048 located below on base 1004 by the downward motion of web 1044 responsive to the forward flow of a document over web 1044, which indicates the presence of a document flowing forward between rollers 1016 and 1018. The engagement of switch portions 1046, 1048 providing a signal that activates the pick rollers 1010.

Extending downward from the rear of web 1044 is a bridge 1047 which intersects with an arm 1049. Arm 1049 is pivotally attached at its free end 1050 to the bottom of base 1004. Extending upwardly from the bottom of base 1004 adjacent the pivotal attachment of arm 1049 and base 1004 is an elongated support 1052. A suitable tension spring 1054 attached to arm 1049 between its free end 1050 and bridge 1047 is attached to support 1052 near its upper end and acts to bias arm 1049 upward, thus urging longitudinal web 1044 upwards.

Two preferred ways are employed by the present invention to establish virtual separation. One preferred way to accomplish virtual separation is by the use of a unique document in each transaction as discussed above. Another preferred way to accomplish virtual separation is by the wand mechanism. In order to accomplish virtual separation in this way, an isolating means in the form of an elongated wand 1056 is located in the stack of documents to isolate the documents of a transaction below the wand from the documents and transactions above the wand. Referring to FIG. 8, the stack of documents 1002 constitutes four sets of transactions 1058a, 1058b, 1058c, 1058d, each transaction being separated from its overlying transaction by an elongated wand 1056a, 1056b, 1056c.

A guide means in the form of a pair of parallel, but spaced elongated guides 1060 extends laterally upward adjacent the rear of the base 1004. Guides 1060 include laterally extending, spaced, adjustable longitudinal support rods 1062 that are carried in unseen slots in base

1004. Support rods 1062 are adapted for longitudinal motion within the unseen slots paralleling planar face 1008, and may be adjusted for moving guides 1060 forwards or backwards to accommodate different size paper. Accordingly, different lengths of wand 1056 may be provided for use in the guides as described in the following to best intermix. different sizes of documents.

Referring to FIG. 9, an elongated slot 1064 extends inwardly along the longitudinal length of each inner, opposing face of elongated guides 1060. Each slot 1064 opposes the other to form a larger guide slot 1066 which extends longitudinally between the upper and lower ends of guides 1060.

Referring to FIG. 8, each wand 1056 is provided with a cylindrical bushing 1068 which surrounds one of its ends and which is slidable longitudinally within guide slot 1066 in a downwards direction as indicated by arrow 1070. Base 1004 includes an elongated slot 1072 which extends forwardly from the rear of base 1004 and connects with guide slot 1066. Slot 1072 is somewhat wider than the width of each wand 1056 so that each wand can pass easily therethrough. The elongated horizontal length of slot 1072 is long enough so that each wand 1056 when located with its bushing 1068 in guide slot 1066 can pass easily therethrough. A V-shaped neck 72, shown in FIG. 2 aids in quick entry of the brushings 1068 into slot 1066.

Again referring to FIG. 8, three wands 1056a, 1056b, 1056c are shown. Each wand 1056a, 1056b, 1056c is positioned with its bushing 1068 lengthwise in the guide slot 1066, and located with its free end within the stack of documents 1002 isolating transactions 1058a, 1058b, 1058c and 1058d from each other. Each wand 1056a, 1056b, 1056c extends over slot 1064 and each wand moves downward as the documents are fed forward one at a time, each wand falling consecutively through slot 1064 when the last document of the transaction located below that wand has been fed forward.

A means for detecting the separation or falling of each wand 1056 in order to determine the end of that transaction is included in the form of a sensor 1074, preferably photoelectric, attached to base 1004 adjacent slot 1064 and connected to the control computer 140 via a serial port or other means for communication therewith. An arm of 1075, the sensor 1074 is triggred by the falling of a wand 1056 through the slot 1072, and the sensor 1074, when triggered, communicates with the control computer 140 and signals the end of that transaction.

The signal received by the control computer 140 from sensor 1074 allows the control computer to establish virtual separation and isolate the documents of each transaction from the documents of another transaction, maintaining the integrity of the transaction. Thus, for example as wand 1056a falls when the last document of transaction 1058a is passed forward, sensor 1074 signals the end of transaction 1058a, which indicates the beginning of transaction 1058b. Likewise, as wand 1056b falls when the last document of transaction 1058b is passed forward, sensor 1074 signals the end of transaction 1058b, which indicates the beginning of transaction 1058c. Likewise, as wand 1056c falls when the last document of transaction 1058c is passed forward, sensor 1074 signals the end of transaction 1058c, which indicates the beginning of transaction 1058d. At the end of transaction 1058d, an additional wand 1056 may be included, or the operator may manually trip sensor 1074, signaling the end of that transaction.

Consequently, a rearwand extending narrow vertical slot 1071 connecting with slot 1066 through which the rear portion 1073 of each wand passes, has a land 1075 at its bottom against which rear portion 1073 engages before falling. Land 1075 advantageously prevents the rear portion of the wands 1056 from prematurely falling and activating the sensor 1074 before the transaction has ended. The falling of the front portion of the wand at the end of the transaction, causing the wand to tilt within slot 1066, thus allowing the rear portion 1073 of the wand to bypass land 1075 and fall. Accordingly, the horizontal length of slot 1066 is sufficiently long for bushing 1068 to tilt.

The falling of a wand 1056 as it leaves the stack of documents and separates from the continued processing flow of the documents, gives rise to a signal being generated from sensor 1074 to the control computer 140. This signal, generated by the falling of a wand 1056, gives the system new capabilities, allowing the control computer 140 to establish virtual separation without using control cards or when no unique document is present, and maintain the integrity of each transaction.

This provides the system with at least two important new capabilities. First, by merely drawing up one of the documents of the transaction, such as a billing statement, any accompanying "white mail" may be quickly referenced as a graphics screen by referencing the transaction identifier generated in the control computer 140 on its reception of the virtual separation signal. This transaction identifier may, for example, constitute a unique serialized number that serves as a data key to locate the database addresses of the graphics screen for each document of the transaction. This allows quick access to "white mail" and other documents included in the transaction that otherwise might become lost in the mail room or other processing area and disassociated from the account or individual.

Second, the system is allowed to establish virtual separation without requiring batch intensive labor, overhead computational time and storage space as required in prior systems where control cards are processed, scanned, and stored along with individual documents. Of course, where all the documents being processed constitute a single batch, instead of using a wand 1056 to signal an end of the batch, the end may be manually triggered by the operator using, switch 1077 on the outside of the base 1004. Operation of the switch 1077 signals an end to the batch. Further, there may be other types of transactions for which manual triggering to signal the of the transaction is preferable, and this is within the scope of the present invention also.

After each document is scanned, each document (as seen in paper path route 130 in FIG. 1a) proceeds to the sequence number printer 132. A Hewlett Packard model 402 audit trail printer, for printing identification numbers on documents before or after scanning, is a preferred device for printing identification numbers on documents. More preferably, a Hewlett Packard Think-Jet printer may be employed for printing identification numbers on documents. The Think-Jet has a movable printhead, and receives information from a sensor identifying the edge of each document. The information from the sensor is processed and passed to the printer to position the printhead so that the identification is printed in the margin of the document. Preferably, the identification is printed in the left margin, and the position for the printhead is determined from an analysis of the scanned image to assure that the printed number is always in the left margin.

After a sequence number is printed on the paper copy of the document, the paper proceeds to a paper stacker selector 134. The paper stacker selector 134 selectively separates checks from other documents and feeds the checks into the paper stacker assembly 136. Checks may be identified by the presence of ferrous based ink, or because they are less than four inches high. In this way, checks are advantageously separated and made available for deposit at a bank. The document separator 62 (depicted in FIG. 2) comprises the sequence number printer 132, the paper stacker selecter 134, and the paper stacker assembly 136, as depicted in FIG. 1(a).

The Capture Management Subsystem

FIG. 1(b) shows a more detailed diagram of the capture management subsystem 10 and its intelligent character reader (ICR) 34. The ICR 34 (FIG. 1), in the preferred embodiment, is an IRIS image recognition integrated systems character reader, available from Image Recognition Integrated Systems Company in Belgium.

Referring to FIG. 1, the output signals representing an electronic raster graphics image of each document, uncompressed or compressed by conventional CCITT Group IV run length algorithms or the like to save space, are provided to the local area network by the image acquisition subsystem 24. The electronic images are provided from the local area network to the capture management subsystem 10. It is within the capture management subsystem that the output signals are used to identify the documents from which those output signals have emanated. The intelligent character reader 34 performs this function by reference to an identification area or an identification word found on the document itself.

The capture management subsystem 10 is assembled on a VME backplane. The capture management subsystem 10 includes, in the preferred embodiment, one or more Force ® model 80386 computers which may be obtained from Force Computers, Inc. in Campbell, Calif., one or more Iris ® brand image character readers, one or more separate Ciprico ® Rimfire 3400 brand disc controllers available from Ciprico Company and a Hitachi hard disk drive. Of course, similar equipment could be substituted in practicing the present invention.

The Storage Management System

The storage management subsystem 20 receives and stores signals representing both the electronic images and signals representing data fields within a document. These electronic images and data fields are provided to the control computer 158 from the local area network 36 (see FIG. 1(c)). The control computer has an interface to an optical disk storage, not shown in the Figures.

Preferably, storage management subsystem 20 is assembled from a PC/AT compatible computer using an 80386 board, Novell Network software two megabytes of expanded memory, and a Western Digital Fasst ® 7000 model disc controller with two 300 megabyte model DK514E38 hard magnetic disc storage devices.

Preferably, the optical disk storage includes a Sony optical disc controller, two Sony ® 450 megabyte worm optical disc drives and a Cygnet ® model 5000 jukebox with 19 slots for optical disc media. A jukebox is a robotic device that selects optical media from an array of slots and inserts optical media into an optical drive. As another option, Sony ® model SMO-S501 erasable optical discs with 325 megabytes per side may be used. However, other comparable components could be substituted.

The Data Correction and Application Support Workstations

There may be several data correction and entry workstations indicated as block 14 in FIG. 1. Each of these are preferably an IBM compatible 80286 or 80386 computer, but other comparable equipment should be substituted. Each of these computers are equipped with a Hercules ® 720 X 348, VGA 640 X 480, EVGA 800 X 600 compatible, for example, or other high resolution display such as a Sigma L-Vue.

Preferably, each workstation 14 is provided with a MicroSoft Windows or equivalent graphical operating system for controlling the display output. The workstation 14 receives the full raster binary image from the LAN system, and when the image is received by the workstation 14, the graphics image is given to the Windows operating system for display.

Each workstation 14 also contains a Proteon LAN interface card, and interfaces with the local area network 36. Accordingly, each workstation 14 communicates with other control computers on the LAN.

Preferably, the application support workstation indicated in FIG. 1 as block 16 is an IBM compatible 80386 AT equipped with a hard disk drive, a high resolution Sigma L-Vue display, decompression hardware or software, and a Fujistu floppy disk drive. The application support workstation 16 connects the local area network 36 to an optional host computer 46. The link to a host computer 46 provides the capability through which human operators may access graphics images resident on the host computer, and change the processed data. Data flows in or out of the local area network 36 from the application support workstation 16.

The Publication Subsystem

The publication subsystem 18 provides an outlet from the local area network 36 for producing hard copies 44, micrographics 42, or facsimile output of stored information or images.

Publication subsystem 18 is preferably assembled from IBM compatible PC AT model 286 computer equipped with a Proteon LAN interface board. Kofax ® compression/decompression boards and output devices suitable to the application are included. If a hard copy output 44 is desired, a Hewlett Packard Laser Jet Series II laser printer may be used. If micrographics 42 are desired as an output from the publication subsystem 18, a model IBase ® film recorder may be used. A facsimile device may provide data transmission with a Gamafax ® modem 40 at a 9600 baud rate to a direct dial phone line.

The subsystems portrayed in FIG. 1 are typical of the preferred embodiment of the present invention. Of course, alternative devices or subsystems functionally equivalent to those depicted in FIG. 1 could be substituted. Additionally, functionally equivalent hardware can be substituted for the specific hardware components recited in the present specification.

Application Subsystem

The local area network 36 communicates with an application subsystem indicated as block 12 in FIG. 1, also known as an application processor. The application subsystem 12 preferably consists of an IBM Compatible Personal Computer, which is available from Systex in Carrollton, Tex. In the preferred embodiment, application subsystem 12 also includes an 80386 board, a Proteon model no. P1303 LAN interface card, a Western Digital ® brand hard disc controller, a 300 megabyte hard disk and two megabytes of extended memory. An IBM compatible 3370 data communications link may connect the application subsystem 12 to a host computer.

Referring to FIG. 1, the application subsystem 12, which may exist in a separate computer, or may share a computer with other subsystems, controls image and data traffic from the storage management subsystem 20 to the application support workstation 16 as the adjudication process ensues after data capture. The application subsystem 12 supervises the extraction of data and transmission of data to the host computer 48.

Processing a Transaction

Figure 3:
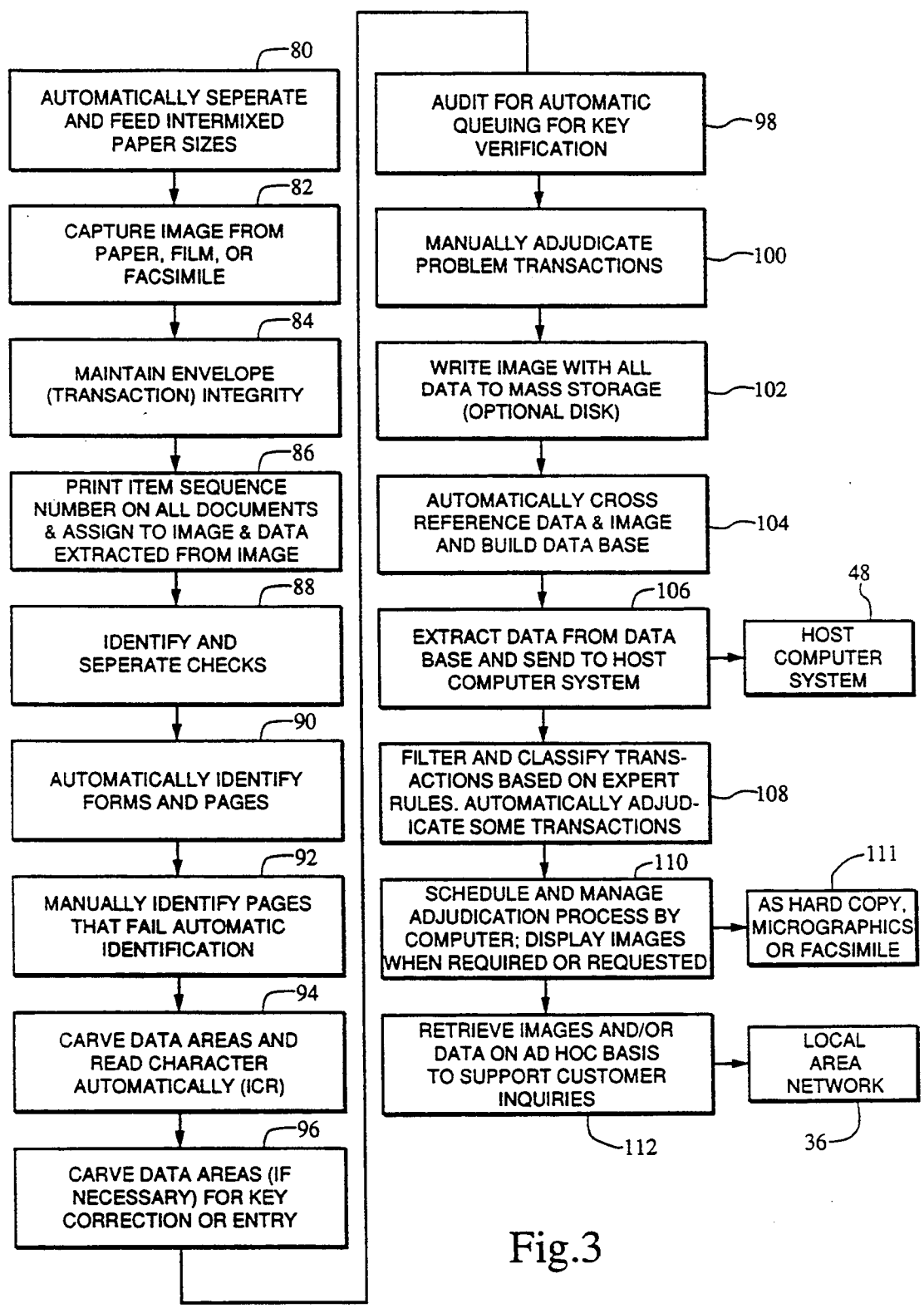
FIG. 3 is a block diagram depicting the sequence of steps in the preferred embodiment of the present invention.

FIG. 3 portrays the typical flow of a transaction in the preferred embodiment of the invention. In step 80 intermixed sizes of sheets and paper and checks, commonly termed documents, are processed as previously described in reference to the image acquisition subsystem in FIG. 1(a). The auto feeder 1000 feeds each document sequentially, one at a time from the bottom of the stack 1002, and introduces it to the optical scanner 60 for data capture.

In step 82 the scanning device captures an image of the paper. Depending on the type of scanner used, such captured image may be at a variety of resolutions from 150 pels per linear inch to 400 pels per linear inch, or even more. The scanner produces a digital bit stream representation of the image that is transmitted to image transformer 138 via a serial port in computer 140.

The raster graphics image produced by the transformer 138 of each document are saved in their uncompressed form for the subsequent identification process and for later other usage. The graphics image of each document is also compressed using the standard CCITT algorithms. Each graphics image is passed to LAN 36 and received therefrom by the capture management subsystem 10. Both the graphics images and the carved graphical data areas are sent to the storage subsystem for storage on magnetic disc. Within the capture management subsystem 10, the image character reader 34 processes each graphics image against pre-selected identification areas for a match. Using the matched identification area for that graphics image, graphical data areas of each graphics image are spatially referenced from the matching graphical representation of the matched identification area and carved therefrom.

Step 84, together with steps 80, 88 and 90 permit the automatic processing of intermixed forms, checks, and documents. The integrity of each separate transaction must be maintained. That is, all the documents relating to a single transaction must be logically "held together" by the system. Referring to FIG. 2, the document feeder 64 provides a wand 68 as previously described which is usable for this purpose. The wand and related switch 70, as previously described and which is attached to the automatic feeder 1000, permit the definition of virtual transaction boundaries without consuming scanner throughout time. The falling of the wand causing switch 70 to generate a signal that is received by control computer 140. Upon the reception of the signal, computer 140 associates, for example, a unique data key with the preceding documents of the transaction. The data key serves to locate addresses of the graphics screen of each document of the transaction for subsequent retrieval from storage. Thus, transaction integrity is obtained, allowing for easy electronic retrieval of all documents of the transaction, including "white mail". Transaction integrity must be maintained; that is, one must, for example, keep the images and data from policyholder A's claim (doctor's report, drug store receipt, etc.) logically associated with A's claim, and not intermixed with policyholder B's claim.

The preferred way to stack each transaction is to load the primary or principal transaction document first. For example, in a tax form processing transaction, the Form 1040 would be loaded first. A specially designed separator document may be used to indicate separation within a transaction. This manual separation may be necessary when a tax return, for example, arrives without a Form 1040 as part of the transaction.

Preferential placement of a unique document as previously disclosed, manual use of the wand switch 70, or insertion of a unique formatted separator document, may also be used to effect transaction integrity.

In step 86, a unique serialized number is printed on all the documents. Each .unique number may include batch identification, transaction identification, transport identification, operator identification, date, time, or other identifying variables. That unique number may also be assigned to the image, stored on magnetic disc, and will be assigned to the data to be subsequently extracted from the image. The unique number serves as the primary key or locator number for the original document.

In step 88, identification and separation of checks from other documents occurs. The preferred embodiment of the invention identifies checks by measuring the dimensions of the image of the check or sensing the presence of the ferrous-based ink printed in the line of characters on the bottom of the check. One or both of these two check-identifying criteria is used to physically separate the check from the other transaction documents by sending the check to a separate output pocket so that checks may later be deposited at a bank.

Steps 80 through 88 are performed within the image acquisition subsystem 24 as shown in FIG. 1. In step 90, forms and pages are automatically identified by the image character reader 34 when the system has been instructed or programmed to anticipate them. That is, when the location and characteristics of the identification area for each page have been defined. This is accomplished by sequentially comparing each of the pre-chosen identification areas in the capture management subsystem 10 to selected, spatially referenced geographic areas of the graphics screen image of the document.

Step 90 permits intermixing different forms, and even permits the intermixing of forms in the properly justified or inverted orientations. Graphics screen images of documents that are not identified automatically by the image character reader 34, are queued for manual identification by human operators looking sequentially at a screen or queue of images and keying in the identification. "White mail" (items included in customer transaction envelopes that are not expected or required for a particular business transaction) will appear in this queue, and be bypassed by the operator for subsequent data manipulation while being retained as a graphics screen image for other subseqent usage.

There are two different ways which may be used to automatically identify forms in step 90. One of the ways is to use the image recognition system 34 to recognize a graphical representation of the identifying word of the form. Each form has a specific geographic identification area containing a specific identification word or words. In order to accomplish this, a pre-chosen series of identifiers is processed against portions of the graphics image. If a match is found, its location within the graphics image is identified as the geographic identification area. Once the geographic identification area is found and identified, other graphical data areas can be located a vector distance measured in binary bits from the identification area.

One of the pre-chosen identifier may be the word "exemptions" as it appears in the upper right margin of the IRS Form 1040. Another may be the word "averagable" as it appears in Schedule G of the IRS Form tax return in the upper middle of the form.

Figure 6:
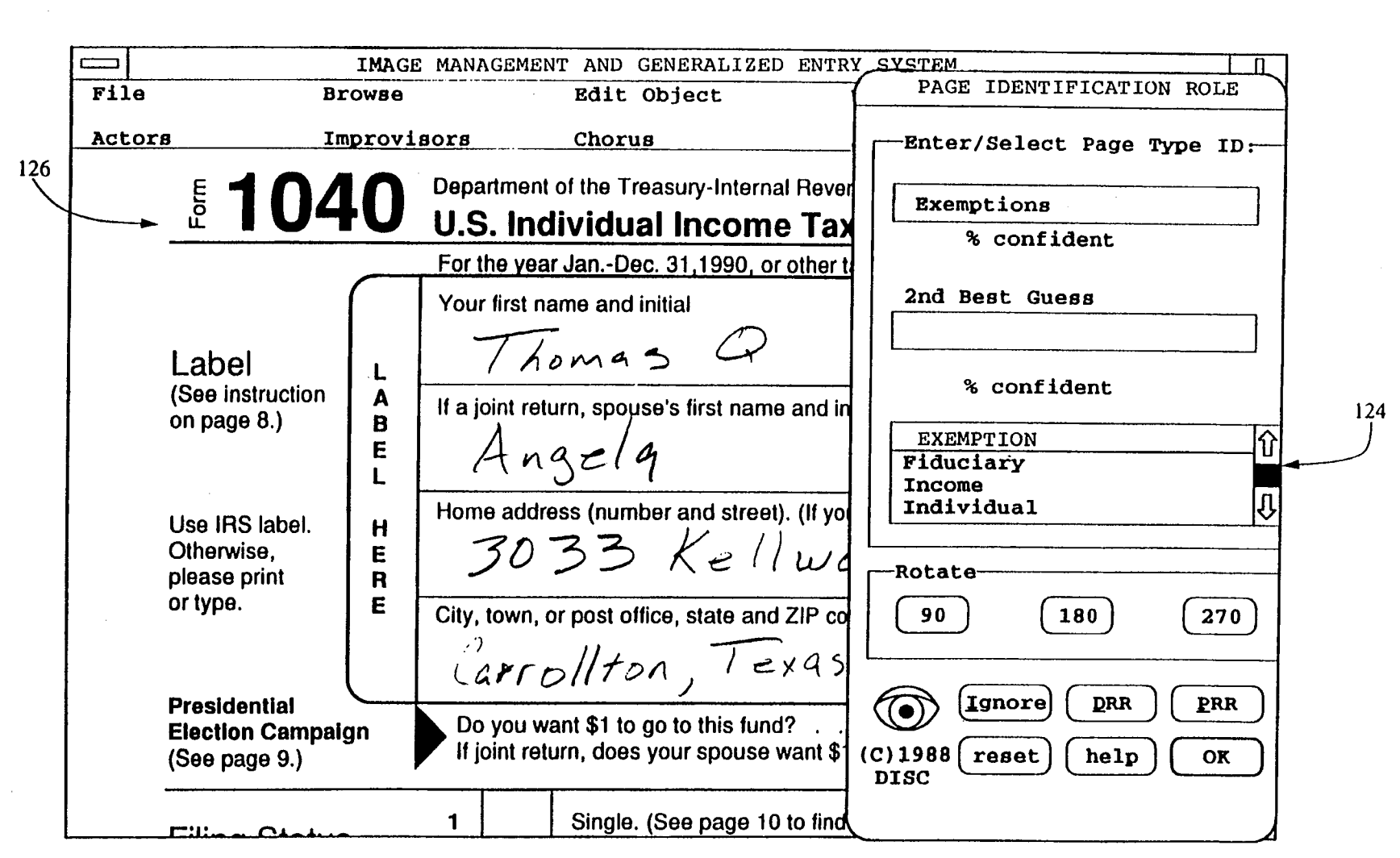

However, and referring to FIG. 6, in the event a graphics screen image is undecipherable due, for example, to extraneous matter on the original from such as accidental ink marks, spilt coffee, etc., the unidentified image is queued for an operator(s) who interprets the image and identifies the image to the system as a 1040 Tax Form. All or part of a digital image of 1040 Form 126 may be queued and available for operator review in this event. This process is indicated in FIG. 3 by block 92. Step 92 further relates to manual identification of obsolete forms. In this case, the graphics screen will be available for interpretation, but carved graphical data areas will not be.

An alternative means to automatically identify forms pursuant to step 90 is by using the ICR to analyze the same geographic template area of each form and evaluating the distribution of black pel's on the white field. The so-called "signature" of this area is unique to each form. Histograms and intersection counts are two criteria used in the present system. Such counts and transformations hereof are accumulated by the ICR for each horizontal and/or vertical line of pel's within the template area. An advantage of this technique is that only one geographic template area need be developed from each form.

Once a particular form is identified, the relative location of the identification word, or "signature" within the carved identification area, is used to adjust the carving of the data fields to be accomplished in step 94. This process adjusts for misregistration and skew that is introduced as part of the form printing process or the scanning process, whether it be from film, paper or facsimile.

The automatic carving in step 94 can be used to exploit existing widely used forms without burdening the automatic identification feature to identify forms that occur very infrequently. In less advanced systems without an intelligent recognition subsystem 34 to accomplish step 90, step 92 may be accomplished concurrently with step 96 relating to key correction and entry if the entire page image is displayed to an operator.

Step 94 relates to the carving of graphical data areas as described in the preceding, once the form has been identified. In step 90, the location and identity of the identification area was identified. Once the location and identity of the identification area has been established, other graphical data areas can be located vector distances, measured in binary bits, from the identification area. The identified graphical data areas are now carved or extracted from the graphic image. These carved graphical data areas are sent to the recognition sub-system 34. Step 94 is optional in the sense that systems may exist and function without it. However, without step 94, all data must be keyed.

Only the area immediately surrounding each graphical images of data to be captured are carved and sent to the recognition subsystem 34. The first such carved graphical data area read is designated the "predictor field," and it is used to distinguish between hand print and machine print data since different character recognition techniques may be used for each. The predictor field can also be used to determine pitch for machine printed characters.

With or without step 94, step 96 is essential because character readers are imperfect and sometimes the output of the character reader must be corrected. If the system does not include one or more charcter readers, then all data must be keyed after carving.

Figure 4:
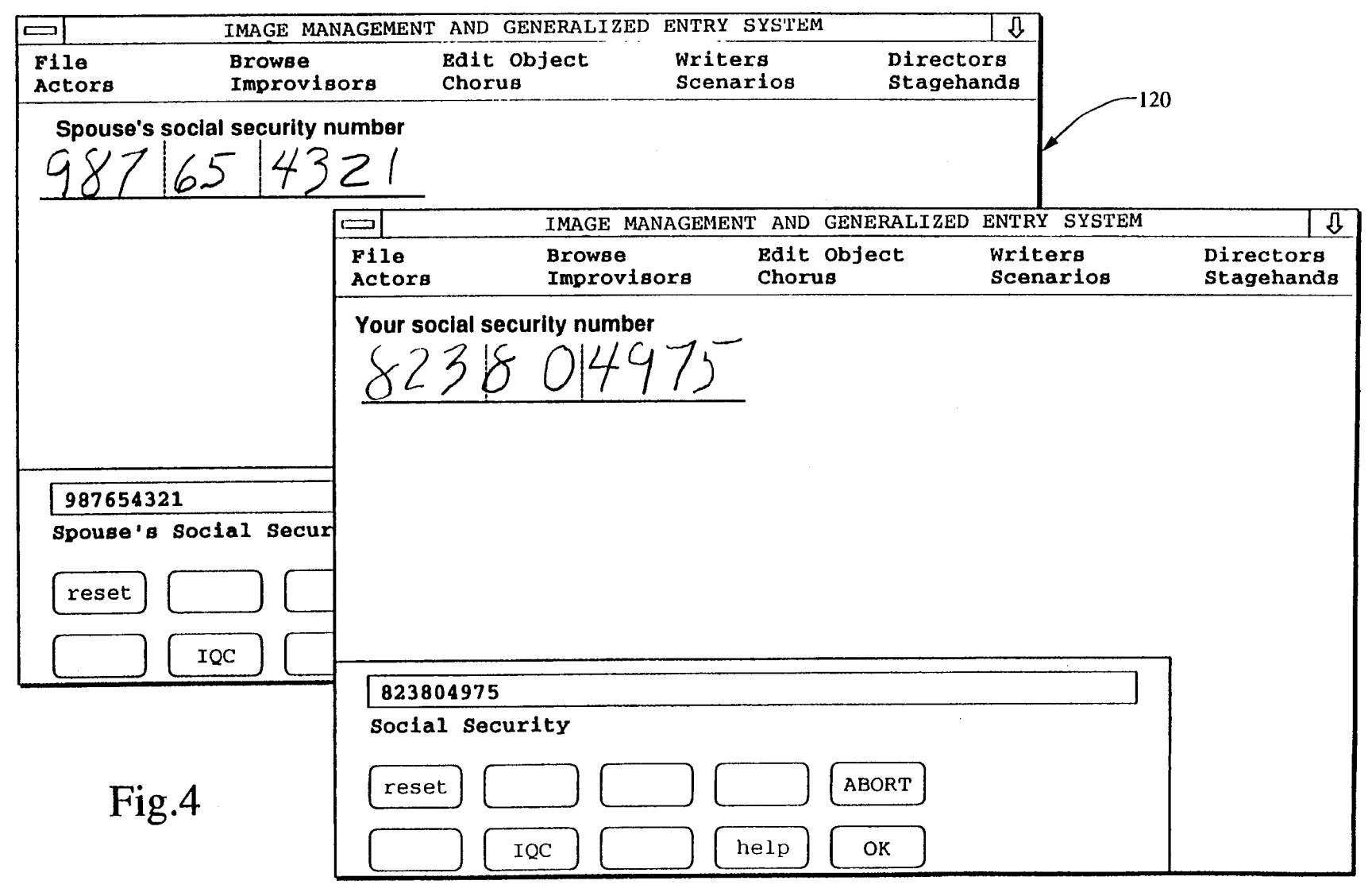

In the event that the predictor field indicates the carved graphical data areas are undecipherable as may occur when the entries of a document were handwritten, each of the carved graphical data areas, such as shown in FIGS. 4 and 5 may be sent to a different clerk for interpretation and keying. This permits individual clerks to specialize. For example, one group of clerks may specialize in keying only numeric fields, which need only a numeric keypad, and another group may specialize in keying alpha numeric fields which require the use of the full keyboard at the data correction/entry workstation 14. Such specialization improves operator productivity by permitting them to build a rhythm. FIG. 4 shows a typical handwritten numeric social security field 120. FIG. 5 shows a typical handwritten alpha-numeric name and address field 122.

Specialization may even extend to a specific field. For example, the social security number for tax return processing as seen in FIG. 4 is a fixed-length numeric field and does not require the stroking of the enter key at the workstation 14 to indicate that the keying of the field is complete.

Operators may specialize in correcting individual characters which have not been recognized. In processing each carved graphical data area, the graphical data area is converted by the image character reader 34 to a representative ASCII character string by procesing individual graphical portions of the data area and converting each individual graphical portion to an ASCII character which is positioned in the string at a location associated with the location of the graphical portion from which it was derived. But, the image character reader 34 may not be able to convert all portions of the graphical data areas to an ASCII character. This may happen for several reasons, including imperfectly formed numbers or letter on the original document or accidental marks such as ink stains that partially or totally obliterate numbers or characters on the original document. Consequently, the image character reader 34 places a universal character, which may be an "*" or other suitable character such as a "!", in the character string The universal character is intermixed in the character string and located within the character string at a position associated with the location of the unconvertable portions in the graphical data area.

Figure 7A:
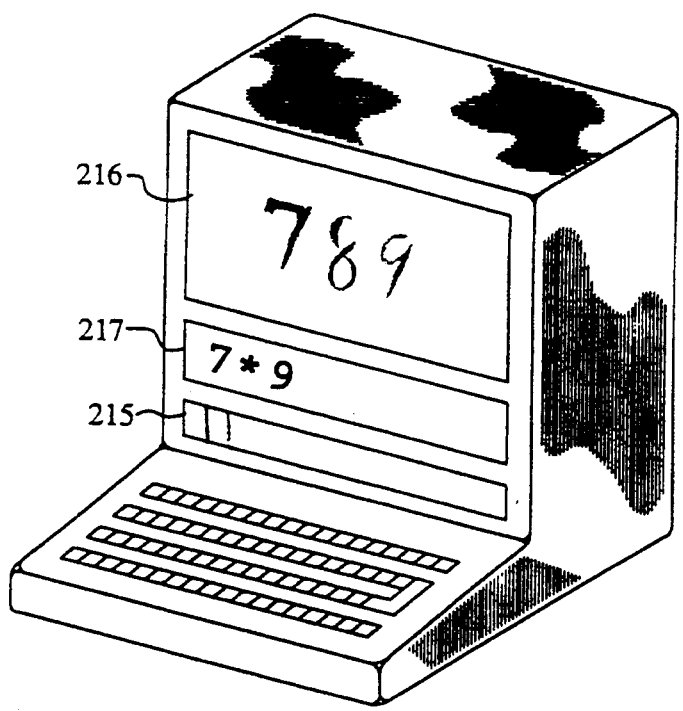
FIG. 7(a) depicts a single character reject as it appears displayed on a correction terminal screen as a graphical data area and a character string with a universal character in the form of an "*" replacing the rejected character.
Figure 7B:
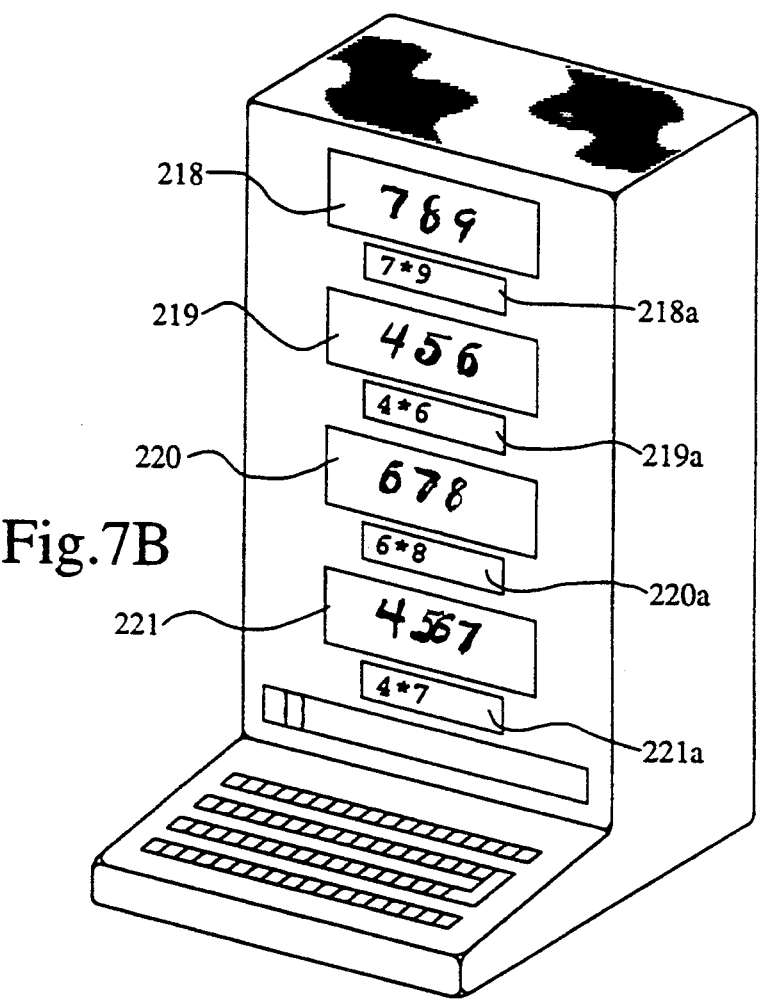
FIG. 7(b) depicts multiple separate character rejects as they appear displayed on a correction terminal screen as graphical data areas and corresponding character strings, each having a universal character in the form of an "*" replacing the rejected character.

The system recognizes that the conversion was partially imperfect. Consequently, both the graphical data area and its representative character string are routed to a correction terminal 14 where both the graphical data area and the representative character string are displayed. The display in FIG. 7a shows one such graphical data area 216 and its representative character string 217 containing a universal character. FIG. 7b illustrates a display which has a number of graphical data areas 218, 219, 220, 221, each graphical data area having a representative character string 218a, 219a, 220a, 221a containing a universal character associated with it.

Referring to FIG. 7a for clarity, the operator examines the graphical data area 216 and interprets the portion of the graphical data area associated with location of the universal character in character string 217. The operator then keys in a character using the keyboard which is representative of the unconverted portion of the graphical data. In FIG. 7a, this is an "8". The input is read by the computer, manipulated and positioned within the character string at the position associated with the universal character, thus replacing the universal character.

The corrected character string may now be displayed, replacing the original character string containing the universal character. The corrected character string is now data keyed, or addressed by the control computer 140 and stored for subsequent use. A number of graphical data areas and their associative character string may be displayed simultaneously as shown in FIG. 7b to reduce the number of required keystrokes and increase the speed of data entry. A prompt, which may be the position of the cursor on the screen alerts the operator to which graphical data area is being examined and interpreted. Of course, the original graphics image from which the graphical data areas were carved need not be altered, leaving the original graphics image for subsequent retrieval.

Step 98 relates to using a computer program to audit data that has been either read by the character reader or keyed to determine its accuracy. An example of such auditing includes the use of check digit routines and testing for ranges. Audits are done automatically and failures are automatically recycled through step 96 using the pertinent queues. When differences in keying occur between operator A and operator B at different data correction/entry substations 14, or in the recognition subsystem 34, then fields or windows can be cycled a third time through step 96 to break the tie. As such, activity by a skilled operator at step 100 may be eliminated, resulting in substantial increases in efficiency and decreases in operating costs.

Step 100 is the first step requiring a skilled human operator. Prior to step 100, all roles for clerical activities may be accomplished by very low-skilled clerks requiring little training. The low-skilled clerks simply key what they see or perform simple manual operations.

During step 100, clerks solve problems. For instance, if a zip code does not match a city, clerks determine which of the two is correct, and subsequently change the wrong element. Clerks may delete incomplete transactions or create two or three separate transactions from one piece of paper. In any event, human judgment is exercised in step 100.

Step 102 relates to the storing of the image. The graphics image, all carved graphical data areas and interpretive character data that has been extracted from the graphics image and all the operator and machine statistics generated in the process are written into storage in the storage management subsystem 20. For example, the identity of the operator who ran the document scanner 32 and the identity of the operator who keyed the social security numeric field 120 may be written into the storage management subsystem 20. This type of instructive information is coded in the data stored on the mass storage media.

Step 104 relates to the "address" or location of the image in storage. A variety of data elements are cross-referenced, one to another, and assembled in a database. A database can be as simple as a "flat file," random or can be constructed upon some relational database model.

Step 106 relates to extracting data from the database and sending it to a host computer system 48. The data sent may be taxpayer records, policyholder records or some other business records. The data is sent using any one of a variety of traditional software protocols. Data is sent to the host computer system 48 via the application subsystem 12 (see FIGS. 1 and 3).

Step 108 relates to computer-based rules applied to data to classify the transaction or to automatically process the transaction. For example, it may be most efficient to pay a simple insurance claim if it is within a model of an acceptable claim, rather than take the time for a human professional to spend time judging the merits of the claim. Additionally, it may be useful to classify insurance claims so that adjudicators can specialize, negating the requirement that human adjudicators be trained to understand all nuances of each type of claim. For example, an insurance adjudicator may specialize in thoracic injuries. By applying such rules relating to a specific type of claim, transactions may be categorized and queued for suitable adjudicators with like skills and with more intensive specific training in one particular area.

Step 110 relates to organization of queues which may have been established during step 108, or in the absence of step 108, by a human supervisor. In any event, work is scheduled from one professional task to another. Tasks are monitored by the system so that they are continually queued for the next workstation 14. The system automatically follows up when work is not passed to the next step in a workflow process before a particular pre-set deadline. Hard copy or facsimile output is selectively permitted at output step 111.

Step 112 relates to the support of customer inquiries received by mail or phone. In processing customer inquiries, graphics images are retrieved and presented to a clerk who services those inquiries upon demand. The retrieval may be based on the item sequence number printed and assigned in step 86, if that number has been transmitted to the host computer. On the other hand, retrieval may be based upon any one of the indices or keys selected during step 104 or other conventional methods common to database application.

Although the best modes contemplated for carrying out the present invention have been herein shown and described, it will be apparent that modification and variation may be made without departing from what is regarded to be the subject matter of the invention. For example, although digital apparatus is disclosed, appropriate analog equivalents may also be employed to form an analog combination suitable for practicing the present invention. It will be apparent to one skilled in the art that relatively simple software instruction may be devised to carry out the exact sequence of steps described in the present specification.

What is claimed is:

1. Apparatus usable for feeding a stack of documents and detecting the boundary of a transaction included in the stack of documents, comprising:
- a base on which a stack of documents is located:
- means associated with said base for feeding a single document from the stack of documents while leaving the remaining documents stacked on said base;
- isolating means located in the stack of documents to isolate the documents of a transaction below said isolating means from the documents above said isolating means, said isolating means moving as the documents are fed one at a time, and separating from the stack when the last document of the transaction below said isolating means has been fed;
- guide means adjacent said isolating means and associated with said base for controlling the motion of said isolating means; and
- means for detecting the separation of said isolating means from said stack for determining the end of the transaction;
- wherein the document is fed forward across said base to a device positioned in front of said base for receiving the document, and wherein said means for feeding a single document includes:
- pick drive means in front of said base for driving the lowermost document of the stack forward from the stack for feeding the document while aligning the next document of the stack to be fed;
- continuous drive means along said base for urging the stack adjacent said pick drive means;
- detecting means adjacent said pick drive means and engaged by the movement of the lower portion of the stack adjacent said pick drive means for activating said pick drive means; and
- means adjacent said pick drive means for allowing only one document to leave the stack at a time.

2. The apparatus of claim 1, wherein said base is an elongated planar base disposed at an angle to the horizontal with its front end positioned at its nadir, and wherein said pick drive means comprises a pair of spaced pick roller means positioned laterally across the forward path of the documents, and in front of said base with their axes lying along a plane parallel to said planar base, said pick roller means turning in a direction suitable for driving the lowermost document of the stack forward.

3. The apparatus of claim 2, wherein the forwardmost of said spaced pick roller means distal said base constitutes a forwardmost pick roller means, and wherein said means for allowing only one document to leave the stack at a time comprises a back scrubber roller means positioned parallel and above said pick roller means, said back scrubber roller means being positioned along the backside of said forwardmost pick roller means and turning in a direction opposite said pick roller means.

4. The apparatus of claim 3, wherein said biasing means is an eccentric roller, said eccentric roller being rotatable for adjusting the pressure applied for urging said forwardmost roller means against said each back scrubber roller roller means.

5. The apparatus of claim 3, wherein said continuous drive means is an elongated belt drive means positioned along said planar base below the stack of documents for engaging the bottom of the stack of documents, said belt drive means turning in a direction suitable for urging the stack forward over said pick roller means to a position having the lower portion of the stack contacting along said back scrubber roller means.

6. The apparatus of claim 5, wherein said back scrubber roller means turns in a direction opposite said pick roller means to allow only one document at a time to leave the stack.

7. The apparatus of claim 6, wherein said detection means engaged by the movement of the lower portion of the stack adjacent said pick drive means comprises a longitudinal web adjacent the front side of said forwardmost pick roller means, said longitudinal web extending outward and forward from the front side of said forwardmost pick roller means below its apex.

8. The apparatus of claim 7, wherein there is included a biasing means between said longitudinal web and said base for urging said longitudinal web adjacent said forwardmost pick roller means.

9. The apparatus of claim 8, wherein said biasing means is a spring.

10. The apparatus of claim 2, wherein there is further included a biasing means between said base and said pick roller means for urging said forwardmost roller means against said back scrubber roller means.

11. Apparatus usable for feeding a stack of documents and detecting the end of a transaction included in the stack of documents, comprising:
- a planar base on which a stack of document is located;
- means associated with said base for feeding a single document from the stack of documents forward across said base to a device positioned in front of said base for receiving the document while leaving the remaining documents stacked on said base;
- a pair of parallel, but spaced elongated guides located adjacent the rear of said base and extending laterally upward therefrom, said base including an elongated slot extending forwardly from the rear of said base and connecting with the space between said parallel arms;
- an elongated wand located in the stack of documents to isolate the documents of a transaction below said wand from the documents above said wand and slidably positioned between said guides to extend over said slot, said wand moving downward between said guides as the documents are fed one at a time forward to the device positioned in front of said base, and falling through said slot when the last document of the transaction below said wand has been fed forward; and
- means for detecting the falling of said wand for determining the end of the transaction;
- wherein said means for feeding a single document includes:
- pick and drive means in front of said base for driving the lower most document of the stack forward from the stack for feeding the document while aligning the next document of the stack to be fed;
- continuous drive means along said planar base for urging the stack adjacent said pick drive means;
- detection means adjacent said pick drive means and engaged by the movement of the lower portion of the stack adjacent said pick drive means for activating said pick drive means; and
- means between said detection means and said base and positioned adjacent said pick drive means for allowing only one document to leave the stack at a time.

12. The apparatus of claim 11, wherein said base is an elongated planar base disposed at an angle to the horizontal with its front end positioned at its nadir, and wherein said pick drive means comprises a pair of spaced pick roller means positioned laterally across the forward path of the documents, and in front of said base with their axes lying along a plane parallel to said planar base, said pick roller means turning in a direction suitable for driving the lowermost document of the stack forward.

13. The apparatus of claim 12, wherein the forwardmost of said spaced pick roller means distal said base constitutes a forwardmost pick roller means, and wherein said means for allowing only one document to leave the stack at a time comprises a back scrubber roller means positioned parallel and above said pick roller means, said back scrubber roller means being positioned along the backside of said forwardmost pick roller means and turning in a direction opposite said pick roller means.

14. The apparatus of claim 13, wherein there is further included a biasing means between said base and said pick roller means for urging forwardmost roller means against said back scrubber roller means.

15. The apparatus of claim 14, wherein said biasing means is an eccentric roller, said eccentric roller being rotatable for adjusting the pressure applied for urging said forwardmost roller means against said back scrubber roller means.

16. The apparatus of claim 15, wherein said continuous drive means is an elongated belt drive means positioned along said planar base below the stack of documents for engaging the bottom of the stack of documents, said belt drive means turning in a direction suitable for urging the stack forward over said pick roller means to a position having the lower portion of the stack contacting along said back scrubber roller means.

17. The apparatus of claim 16, wherein said back scrubber roller means turns in a direction opposite said pick roller means to allow only one document at a time to leave the stack.

18. The apparatus of claim 17, wherein said detection means engaged by the movement of the lower portion of the stack adjacent said pick drive means comprises a longitudinal web adjacent the front side of said forwardmost pick roller means, said longitudinal web extending outward and forward from the front side of said forwardmost pick roller means below its apex.

19. The apparatus of claim 18, wherein there is included a biasing means between said longitudinal web and said base for urging said longitudinal web adjacent said forwardmost pick roller means.

20. The apparatus of claim 19, wherein said biasing means is a spring.

21. The apparatus of claim 14 wherein the guide is specially adapted to allow each wand to slide within the guide downwardly in a direction substantially perpendicular to the base.

22. The apparatus of claim 11, wherein said means for detecting the falling of said wand comprises a sensor associated with said base, said sensor being triggered by the falling of said wand through said slot.

23. An apparatus for automatically feeding a paper document from a stack of pieces of paper having differing sizes to a paper transport, the apparatus comprising:
a base for receiving a stack of pieces of paper for feeding to a paper transport;
a drive for picking a piece of paper from a stack of paper documents and feeding the picked piece of paper toward the paper transport for being taken up by the paper transport, the paper transport being adjacent the drive;
a support adjacent the drive and on a side of the drive opposite the base for supporting a piece of paper as it is being fed from the drive to the paper transport; the support deflecting in a first direction under tension of a piece of paper being taken up by the paper transport; the support further being biased to deflect in a second direction generally opposite the first direction when a paper document being fed by the drive begins to buckle toward the second direction; the support being adapted to bias a paper document being driven to buckle in the second direction;
a sensor responsive to the position of the support for indicating that a piece of paper being fed to the paper transport is buckling, the drive coupled to the sensor for responding to an indication that the piece of paper is buckling.

24. The apparatus of claim 23 wherein the support is spring-loaded for biasing in the second direction and wherein the drive responds to the sensor sensing deflection of the support in the first direction by feeding a document.

25. The apparatus of claim 24 wherein the drive includes a pick roller.

26. The apparatus of claim 25 wherein the drive further includes a back scrubber roller cooperating with the pick roller for picking only one piece of paper from a bottom of a stack of paper on the base.

27. The apparatus of claim 25 wherein the drive further includes means for continuously urging a bottom of a stack of papers on the base toward the pick roller, and wherein operation of the pick drive is responsive to the sensor sensing the support deflecting in the first direction, a piece of paper being urged against the pick drive by the means for urging tending to deflect the support in the first direction to operate the pick drive.

28. An apparatus for automatically feeding to a paper transport a stack of documents separable into a plurality of transactions, the apparatus comprising:
a base for receiving a stack of paper documents separable into a plurality of transactions, the base including an elongated opening over which the stack of paper documents is received;
a drive located on a first side of the base for picking and feeding a paper document from a bottom of the stack of documents;
a wand for physically separating the adjacent paper documents that are a part of separate transactions and defining a transaction boundary;
a guide located on a second side of the base for retaining ends of a plurality of wands in relation to the stack of paper documents to maintain separation between transactions while the drive feeds paper documents from the bottom of the stack; each wand having an end adapted to be received by the top of the guide; the guide being adapted to retain the plurality of wands in a stack-like manner so that the wand retains a separation between paper documents at transaction boundaries and is further adapted to allow a wand to fall through the elongated opening in the base when the last paper document in the transaction below the wand is fed by the drive; and
a detector for sensing the falling of the wand through the opening and indicating a transaction boundary.

29. The apparatus of claim 28 wherein the wand has a length that is a substantial portion of the size of the base for separating paper documents having smaller dimensions from paper documents having substantially larger dimensions.

* * * * *